(12) United States Patent
Kondo et al.

(10) Patent No.: US 11,885,902 B2
(45) Date of Patent: Jan. 30, 2024

(54) VEHICLE RADAR SYSTEM

(71) Applicant: DENSO CORPORATION, Kariya (JP)

(72) Inventors: Katsuhiko Kondo, Nisshin (JP);
Yusuke Akamine, Nisshin (JP);
Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 867 days.

(21) Appl. No.: 16/931,350

(22) Filed: Jul. 16, 2020

(65) Prior Publication Data

US 2020/0346653 A1   Nov. 5, 2020

Related U.S. Application Data

(63) Continuation of application No. PCT/JP2019/001103, filed on Jan. 16, 2019.

(30) Foreign Application Priority Data

Jan. 18, 2018   (JP) .................. 2018-006386

(51) Int. Cl.
*G01S 7/02* (2006.01)
*G01S 13/08* (2006.01)
*G01S 13/931* (2020.01)

(52) U.S. Cl.
CPC ............... *G01S 7/02* (2013.01); *G01S 13/08* (2013.01); *G01S 13/931* (2013.01); *B60W 2420/52* (2013.01)

(58) Field of Classification Search
CPC . G01S 7/02; G01S 7/292; G01S 7/354; G01S 13/08; G01S 13/931; B60W 2420/52
See application file for complete search history.

(56) References Cited

U.S. PATENT DOCUMENTS

| | | | | |
|---|---|---|---|---|
| 6,323,802 | B1* | 11/2001 | Tokoro | G01S 13/931 342/70 |
| 6,693,583 | B2* | 2/2004 | Tamatsu | G01S 7/354 180/169 |
| 8,130,138 | B2* | 3/2012 | Kikuchi | G01S 13/42 342/72 |
| 8,570,213 | B2* | 10/2013 | Nishiyama | G01S 7/292 342/91 |
| 9,372,260 | B2* | 6/2016 | Kambe | G01S 13/931 |
| 9,739,881 | B1* | 8/2017 | Pavek | G01S 13/865 |

(Continued)

FOREIGN PATENT DOCUMENTS

JP   2016-148547 A   8/2016

*Primary Examiner* — Peter M Bythrow
(74) *Attorney, Agent, or Firm* — MASCHOFF BRENNAN

(57) ABSTRACT

A vehicle radar system includes at least one radar, a detection section, an extraction section, a pair determination section, and a target position determination section. The extraction section extracts at least one observation point pair from a plurality of detected observation points. The observation point pair is a pair of the observation points located in the same direction. The target position determination section calculates a surface direction of a reflection surface from a reflection surface observation point of the observation point pair and observation points around the reflection surface observation point, and determines a position of the target from the calculated surface direction and the at least one observation point pair.

14 Claims, 7 Drawing Sheets

(56) References Cited

U.S. PATENT DOCUMENTS

| | | | |
|---|---|---|---|
| 2003/0122703 A1* | 7/2003 | Kishida | G01S 13/345 342/107 |
| 2003/0179129 A1* | 9/2003 | Tamatsu | G01S 13/582 342/107 |
| 2006/0262007 A1* | 11/2006 | Bonthron | G01S 13/44 342/107 |
| 2012/0268314 A1* | 10/2012 | Kuwahara | G01S 13/42 342/147 |
| 2014/0159948 A1* | 6/2014 | Ishimori | G01S 13/931 342/200 |
| 2014/0247180 A1* | 9/2014 | Moriuchi | G01S 7/354 342/90 |
| 2014/0292558 A1* | 10/2014 | Asanuma | G01S 13/345 342/128 |
| 2014/0313070 A1* | 10/2014 | Asanuma | G01S 7/41 342/200 |
| 2015/0204972 A1* | 7/2015 | Kuehnle | G01S 13/42 342/156 |
| 2015/0234045 A1* | 8/2015 | Rosenblum | G01S 13/931 342/70 |
| 2015/0247924 A1* | 9/2015 | Kishigami | G01S 7/411 342/146 |
| 2015/0355315 A1* | 12/2015 | Shimizu | G01S 13/42 342/107 |
| 2017/0176593 A1* | 6/2017 | Satou | G01S 13/56 |
| 2017/0307749 A1* | 10/2017 | Shimizu | G08G 1/166 |
| 2017/0363720 A1* | 12/2017 | Moriuchi | G01S 13/536 |
| 2017/0363732 A1* | 12/2017 | Ishimori | G01S 13/524 |
| 2017/0363737 A1* | 12/2017 | Kaino | G01S 13/345 |

\* cited by examiner

VEHICLE RADAR SYSTEM

CROSS-REFERENCE TO RELATED APPLICATION

This application is based on and claims the benefit of priority from earlier Japanese Patent Application No. 2018-006386 filed Jan. 18, 2018, the description of which is incorporated herein by reference.

BACKGROUND

Technical Field

The present disclosure relates to a radar system for a vehicle.

Related Art

A detection apparatus is disclosed which uses a mirror ghost caused by radar waves radiated from a radar and reflected from an obstruction such as a wall.

SUMMARY

As an aspect of the present disclosure, a vehicle radar system is installed in a vehicle. The system includes: at least one radar configured to observe areas around the vehicle and different from each other; a detection section configured to detect a plurality of observation points from observation data obtained by the radar; an extraction section configured to extract at least one observation point pair from the plurality of observation points detected by the detection section, the at least one observation point pair being a pair of the observation points located in the same direction with reference to the radar; a pair determination section configured to determine each observation point of the at least one observation point pair extracted by the extraction section further from the radar to be a mirror ghost observation point indicating a mirror ghost of a target, and determines each observation point of the at least one observation point pair nearer to the radar to be a reflection surface observation point indicating a reflection surface reflecting reflected waves from the target; and a target position determination section configured to calculate a surface direction of the reflection surface on a bird's eye view of the vehicle from above the vehicle, from the reflection surface observation point of the at least one observation point pair and observation points around the reflection surface observation point, and determine a position of the target from the calculated surface direction and the at least one observation point pair.

DETAILED DESCRIPTION OF THE PREFERRED EMBODIMENTS

JP-A-2016-148547 discloses a detection apparatus that uses a mirror ghost caused by radar waves radiated from a radar and reflected from an obstruction such as a wall. The detection apparatus extracts, as an observation pair, a pair of observation points located in the same direction with reference to the radar. The detection apparatus determines one of the pair of observation points nearer to the radar to be an obstruction observation point that is derived from the obstruction, and determines the other of the pair of observation points to be a mirror ghost observation point that is derived from the mirror ghost of the target. In addition, the detection apparatus determines any one of positions to be the position of the target, the distance between the positions and the obstruction observation point belonging to a first observation point being equal to the distance between the mirror ghost observation point belonging to the first observation point and the obstruction observation point belonging to the first observation point, the distance between the positions and the obstruction observation point belonging to a second observation point being equal to the distance between the mirror ghost observation point belonging to the second observation point and the obstruction observation point belonging to the second observation point A detailed study by the inventor found a problem that since determining the position of a target uses two pairs of observation points, when there is only one pair of observation points, the position of the target cannot be determined.

An aspect of the present disclosure is to determine a position of a target even when there is only one pair of observation points.

Hereinafter, with reference to the drawings, an illustrative embodiment of the present disclosure will be described.

<1. Overall Configuration>

Figure 1:
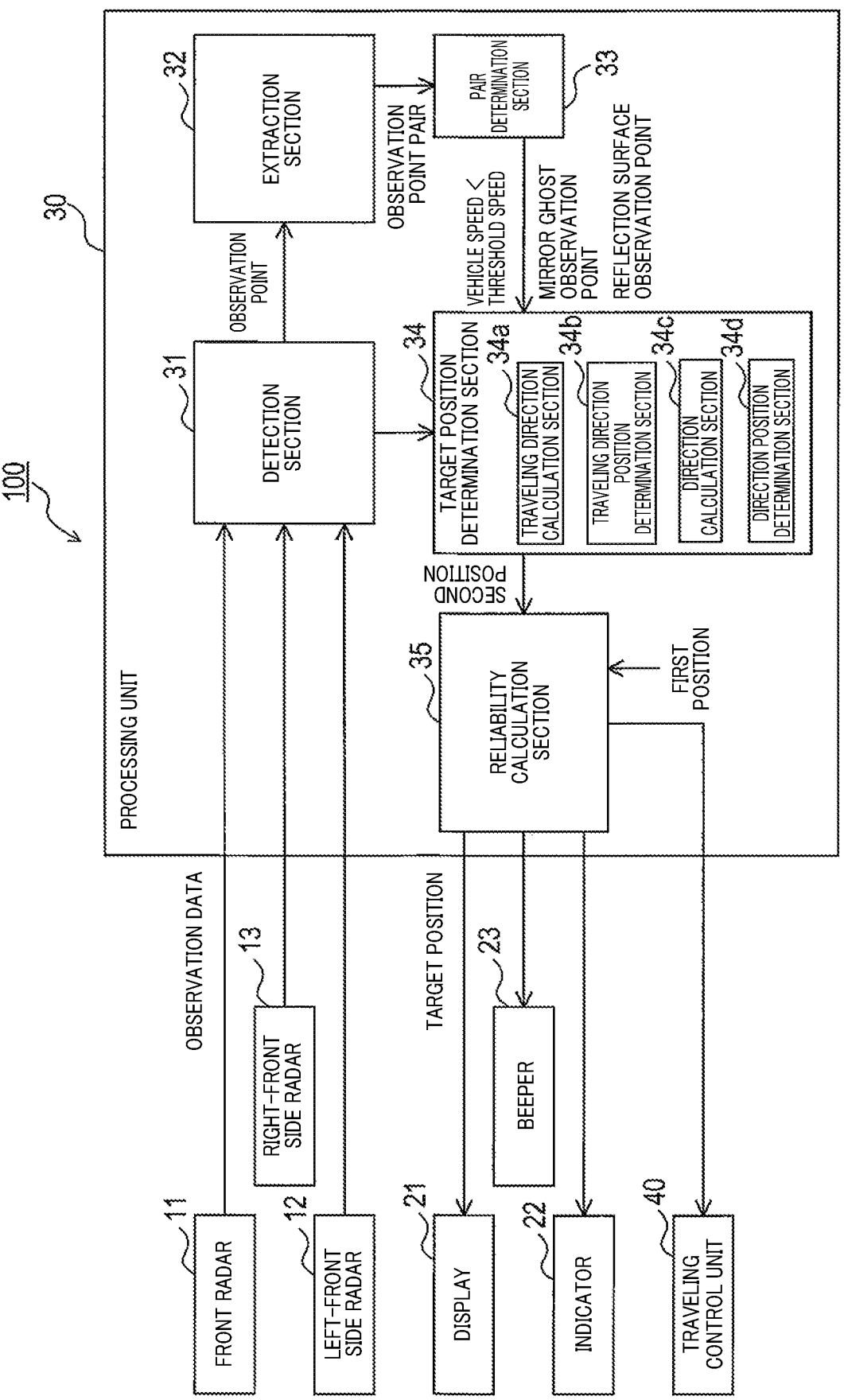
FIG. 1 is a block diagram illustrating a configuration of a vehicle radar system according to an embodiment.

First, the configuration of a vehicle radar system 100 according to the present embodiment will be described with reference to FIG. 1. The vehicle radar system 100 includes a front radar 11, a left-front side radar 12, a right-front side radar 13, a processing unit 30, a display 21, an indicator 22, a beeper 23, and a traveling control unit 40.

The front radar 11, the left-front side radar 12, and the right-front side radar 13 are millimeter-wave radars. The modulation method of the three radars 11 to 13 may be an FMCW method, a two-frequency CW method, a multifrequency CW method, or a pulse method, and is not limited. The radars 11 to 13 are configured to respectively observe areas different from each other around a vehicle 50.

Figure 2:
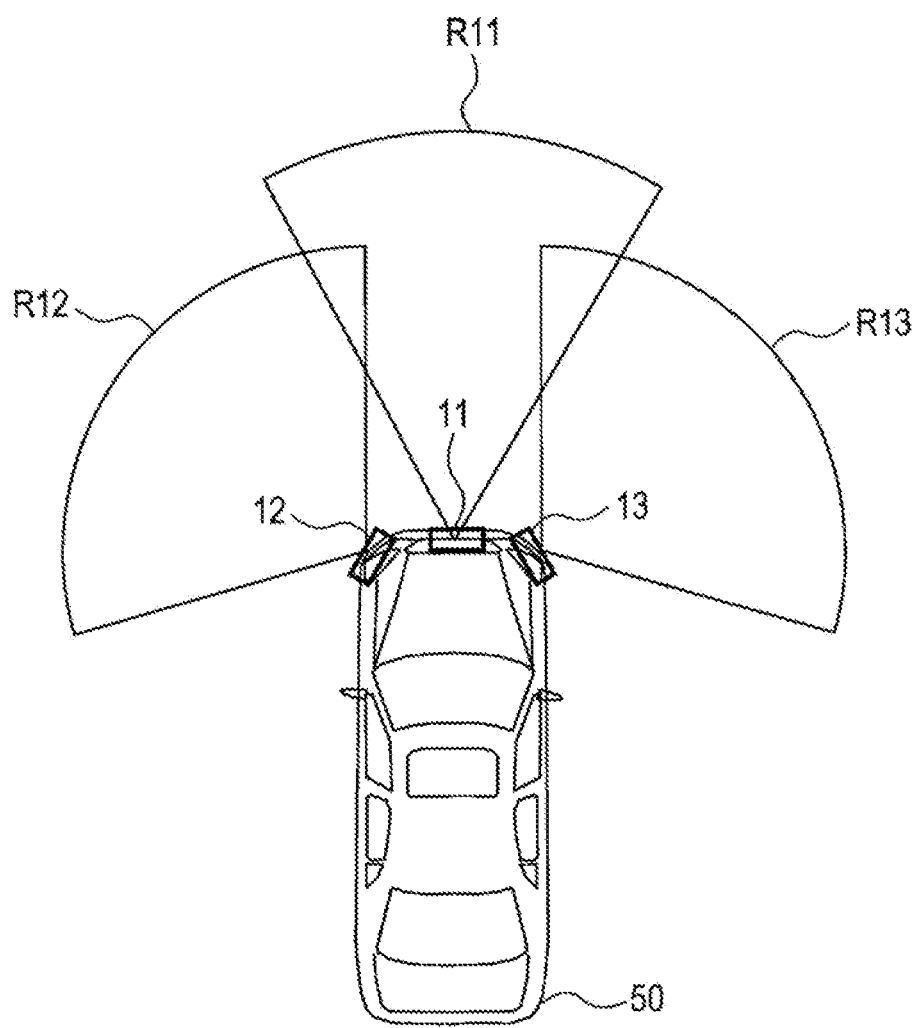
FIG. 2 is a diagram illustrating positions at which radars are mounted according to the embodiment.

As shown in FIG. 2, the front radar 11 is mounted at a front center of the vehicle 50, for example, the center of a front bumper. An observation area R11 of the front radar 11 is located forward from the center of the vehicle 50. The left-front side radar 12 is mounted at a left and front side of the vehicle 50, for example, a left end of the front bumper. An observation area R12 of the left-front side radar 12 is located forward and leftward from the vehicle 50. The right-front side radar 13 is mounted at a right and front side of the vehicle 50, for example, a right end of the front bumper. An observation area R13 of the right-front side radar 13 is located forward and rightward from the vehicle 50.

The three radars 11 to 13 transmit radar waves and receive the radar waves reflected from a target to observe the target Tg. The three radars 11 to 13 transmit observation data of the target Tg to the processing unit 30 described later. The observation data includes information on a direction of the target Tg with respect to the vehicle and a distance from the vehicle to the target Tg. Hereinafter, the radars 11 to 13 are referred to collectively as a radar 10.

The processing unit 30 is an electronic control unit (ECU) including a CPU, a ROM, a RAM, and the like. In the processing unit 30, the CPU executes a program stored in the ROM to implement functions of a detection section 31, an extraction section 32, a pair determination section 33, a target position determination section 34, and a reliability calculation section 35. The target position determination section 34 has functions of a traveling direction calculation section 34a, a traveling direction position determination section 34b, a direction calculation section 34c, and a direction position determination section 34d. The functions of the processing unit 30 will be described later.

The processing unit 30 determines a position of the target Tg form observation data received from the radar 10 to calculate reliability of the determined position of the target Tg. If the reliability of the determined position of the target Tg exceeds a predetermined reliability threshold value, the processing unit 30 fixes a target position. The processing unit 30 performs, among other processes, a target position determination process for determining a position of the target Tg based on a mirror ghost. The mirror ghost is a virtual image generated by reflected waves, which are radar waves reflected from the target Tg, reflected from a reflection surface, and then returning to the radar 10. The reflection surface is a wall, a guardrail or the like around the vehicle 50. When the distance from a reflection point of reflected waves on the reflection surface to the target Tg is defined as Lt, a mirror ghost is observed at a position in the direction to the reflection point with respect to the vehicle 50 and distanced from the reflection point by the distance Lt.

The processing unit 30 determines a probability of a collision between the vehicle 50 and the target Tg based on the fixed position of the target Tg. If a collision between the vehicle 50 and the target Tg is likely to occur, the processing unit 30 transmits a detection signal indicating that the target Tg with which a collision is likely to occur is detected, to the display 21, the indicator 22, the beeper 23, and the traveling control unit 40. The three radars 11 to 13 may be respectively provided with the processing units 30, which may individually process the respective observation data of the radars 11 to 13. Alternatively, a single processing unit 30 may be provided to the three radars 11 to 13, and the single processing unit 30 may centrally process the observation data of the radars 11 to 13.

The display 21, the indicator 22, and the beeper 23 are alarm devices that issues an alarm in response to a detection signal from the processing unit 30 when the processing unit 30 has detected a target Tg that is present near the vehicle 50 and is likely to cause a collision. The display 21 is provided in the interior of the vehicle and displays an alarm. The indicator 22 is provided to a door mirror or in the interior of the vehicle and issues an alarm by blinking or the like. The beeper 23 is provided in the interior of the vehicle and outputs an alarm sound. Instead of these alarm devices, or in addition to these alarm devices, a loudspeaker that outputs an alarm with a voice may be provided in the interior of the vehicle. All the above alarm devices are not required to be provided, but at least one of the above alarm devices may be provided.

When the processing unit 30 has detected a target Tg that is present near the vehicle 50 and is likely to cause a collision, the traveling control unit 40 controls travel of the vehicle 50 according to a detection signal from the processing unit 30 so as to avoid the collision between the vehicle 50 and another vehicle. Specifically, the traveling control unit 40 controls a brake, an accelerator and a steering wheel of the vehicle 50.

<2. Target Position Determination Process>

Figure 3:
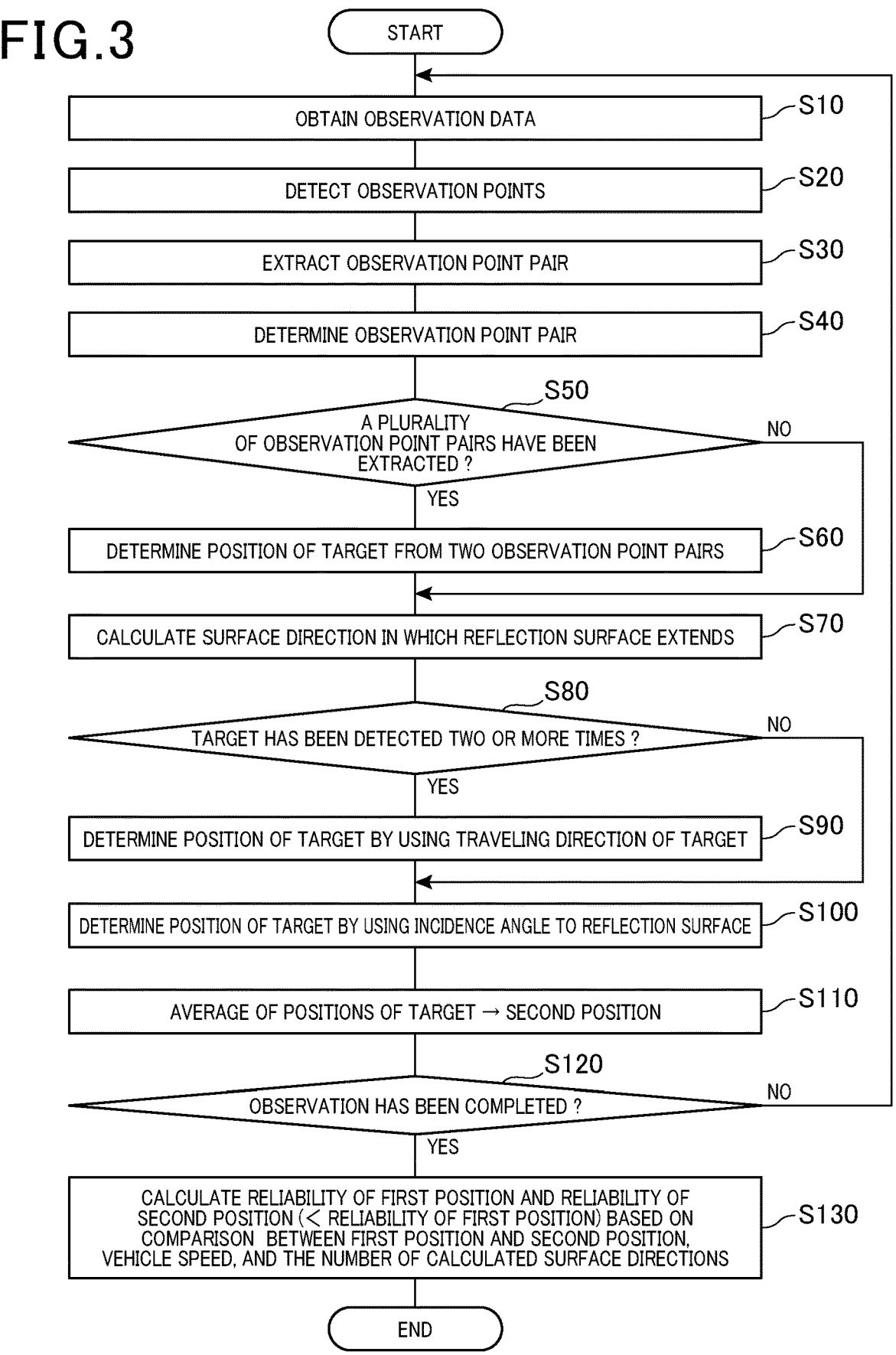
FIG. 3 is a flowchart illustrating a procedure of a target position determination process according to the embodiment.

Next, the target position determination process performed by the processing unit 30 will be described with reference to a flowchart in FIG. 3. The processing unit 30 starts the target position determination process when, for example, an ignition is turned on. Although the processing unit 30 performs a target position determination process based on a direct signal in parallel to a target position determination process based on a mirror ghost, the description of the target position determination process based on a direct signal is omitted herein. The direct signal is a received signal including reflected waves directly received from the target.

First, in S10, the detection section 31 obtains observation data from the radar 10.

Next, in S20, the detection section 31 detects a plurality of observation points from the obtained observation data to recognize positions of the respective observation points viewed from the vehicle 50, specifically, directions and distances to the respective observation points.

Next, in S30, the extraction section 32 extracts an observation point pair from the plurality of observation points detected by the detection section 31, the observation point pair being a pair of observation points located in the same direction with reference to the radar 10. As described above, a mirror ghost is generated in the same direction as a reflection point on a reflection surface with respect to the radar 10. Hence, the extraction section 32 extracts an observation point pair including an observation point based on a mirror ghost.

Next, in S40, the pair determination section 33 determines one of the pair of observation points extracted by the extraction section 32 to be a mirror ghost observation point indicating a mirror ghost of the target Tg, and determines the other of the pair of observation points to be a reflection surface observation point indicating a reflection surface generating the mirror ghost. Specifically, as described above, a mirror ghost is observed at a position distant from the reflection surface, which generates the mirror ghost, with respect to the radar 10. Hence, the pair determination section 33 determines an observation point of the observation point pair further from the radar 10 to be a mirror ghost observation point, and determines an observation point of the observation point pair nearer to the radar 10 to be a reflection surface observation point.

Next, in S50, the pair determination section 33 determines whether a plurality of observation point pairs have been extracted in S30. If it is determined that a plurality of observation point pairs have been extracted in S30, the present process proceeds to S60. If it is determined that only one observation point pair has been extracted in S30, the present process skips S60 and proceeds to S70.

Figure 4:
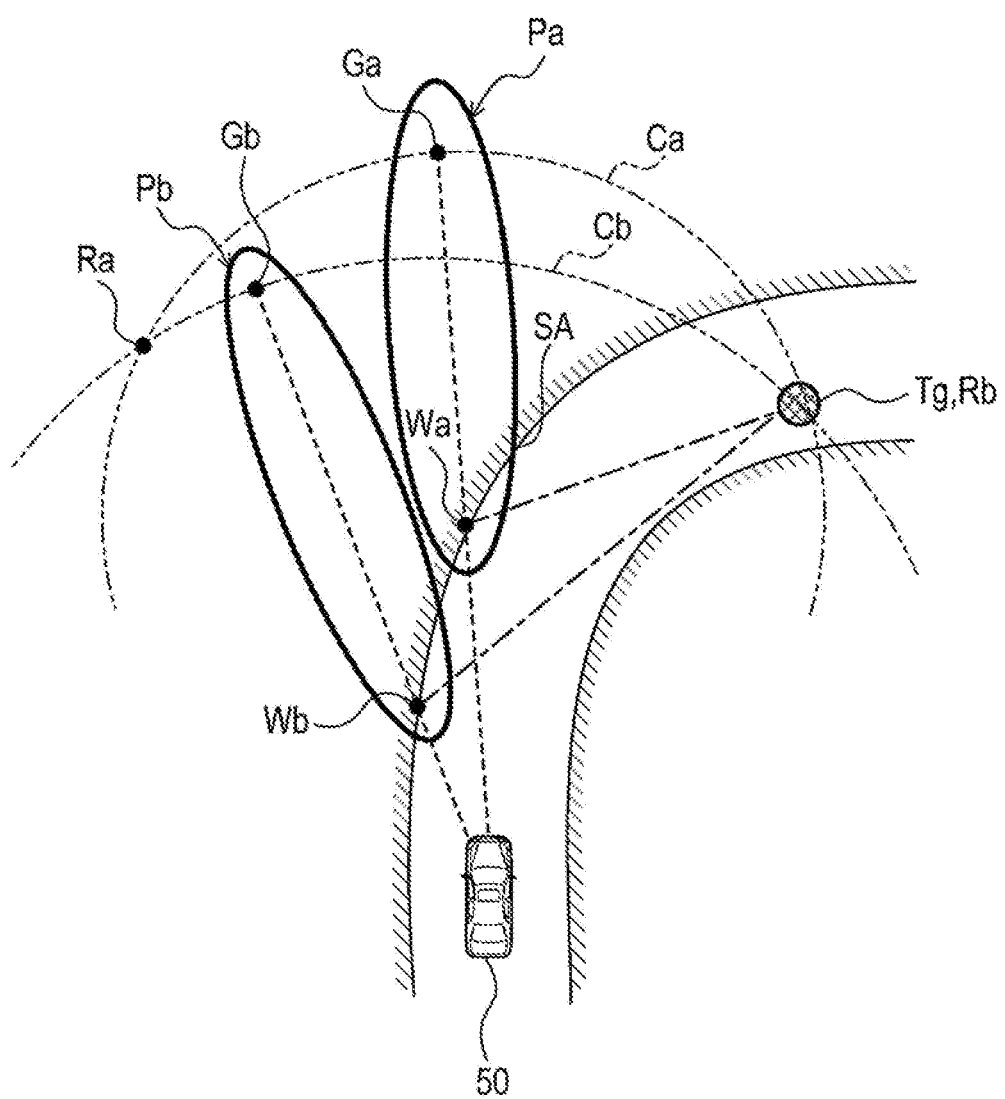
FIG. 4 is a diagram illustrating a method for determining a position of a target from two or more pairs of observation points.

In S60, the target position determination section 34 determines a position of the target Tg from the two observation point pairs. For example, in FIG. 4, a first observation point pair Pa consisting of a first reflection surface observation point Wa on a reflection surface SA and a first mirror ghost observation point Ga, and a second observation point pair Pb consisting of a second reflection surface observation point Wb on the reflection surface SA and a second mirror ghost observation point Gb are extracted.

The target position determination section 34 calculates a first virtual circle Ca centering on the first reflection surface observation point Wa and passing through a first mirror ghost observation point Ga, and a second virtual circle Cb centering on the second reflection surface observation point Wb and passing through a second mirror ghost observation point Gb. Furthermore, the target position determination section 34 calculates two intersections Ra, Rb of the first virtual circle Ca and the second virtual circle Cb, and sets the two intersections Ra, Rb as candidates for a position of the target Tg. Then, the target position determination section 34 determines the position of the intersection Rb, which is nearer to the traveling course of the vehicle 50 than that of the intersection Ra is, to be the position of the target Tg.

Next, the target position determination section 34 determines a position of the target Tg by a method that can be performed even when only one observation point pair has been extracted.

Figure 5:
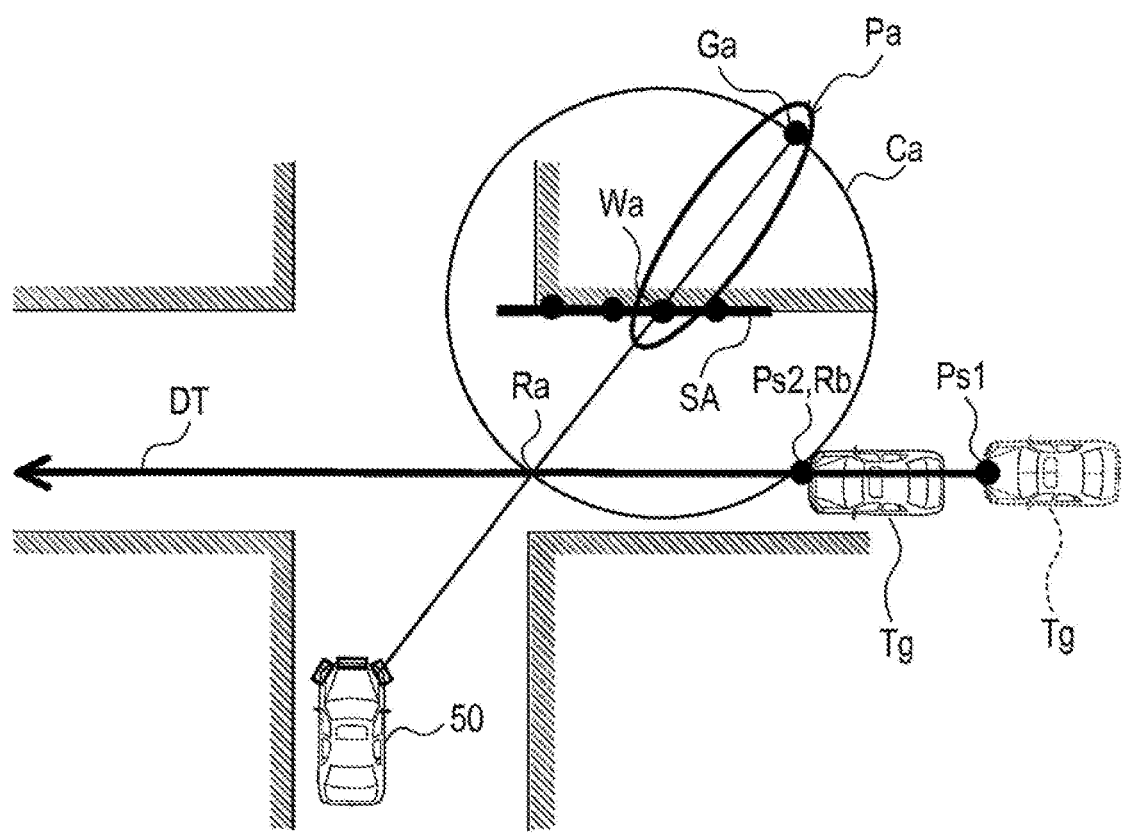
FIG. 5 is a diagram illustrating an example of a method for determining a position of a target from a pair of observation points, a direction in which a reflection surface extends, and a traveling direction of the target.

First, in S70, the target position determination section 34 calculates a surface direction in which a reflection surface extends on a bird's eye view of the vehicle 50 from above the vehicle 50. For example, in FIG. 5, only one observation point pair Pa consisting of the reflection surface observation point Wa on the reflection surface SA and the mirror ghost observation point Ga is extracted. In FIG. 5, filled circles indicate observation points.

The target position determination section 34 calculates a surface direction, in which the reflection surface SA extends on a bird's eye view of the vehicle 50 from above the vehicle 50, from the reflection surface observation point Wa and observation points around the reflection surface observation point Wa included in the observation points detected in S20. Radar waves radiated from the radar 10 to the reflection surface SA are reflected from a plurality of positions on the reflection surface SA and returns to the radar 10. Hence, as shown in FIG. 5, on the reflection surface SA, a plurality of observation points are detected on the same line. Hence, the target position determination section 34 calculates a surface direction, in which the reflection surface SA extends, from the reflection surface observation point Wa and the plurality of observation points assumed to be on the same line as the reflection surface observation point Wa is.

Figure 6:
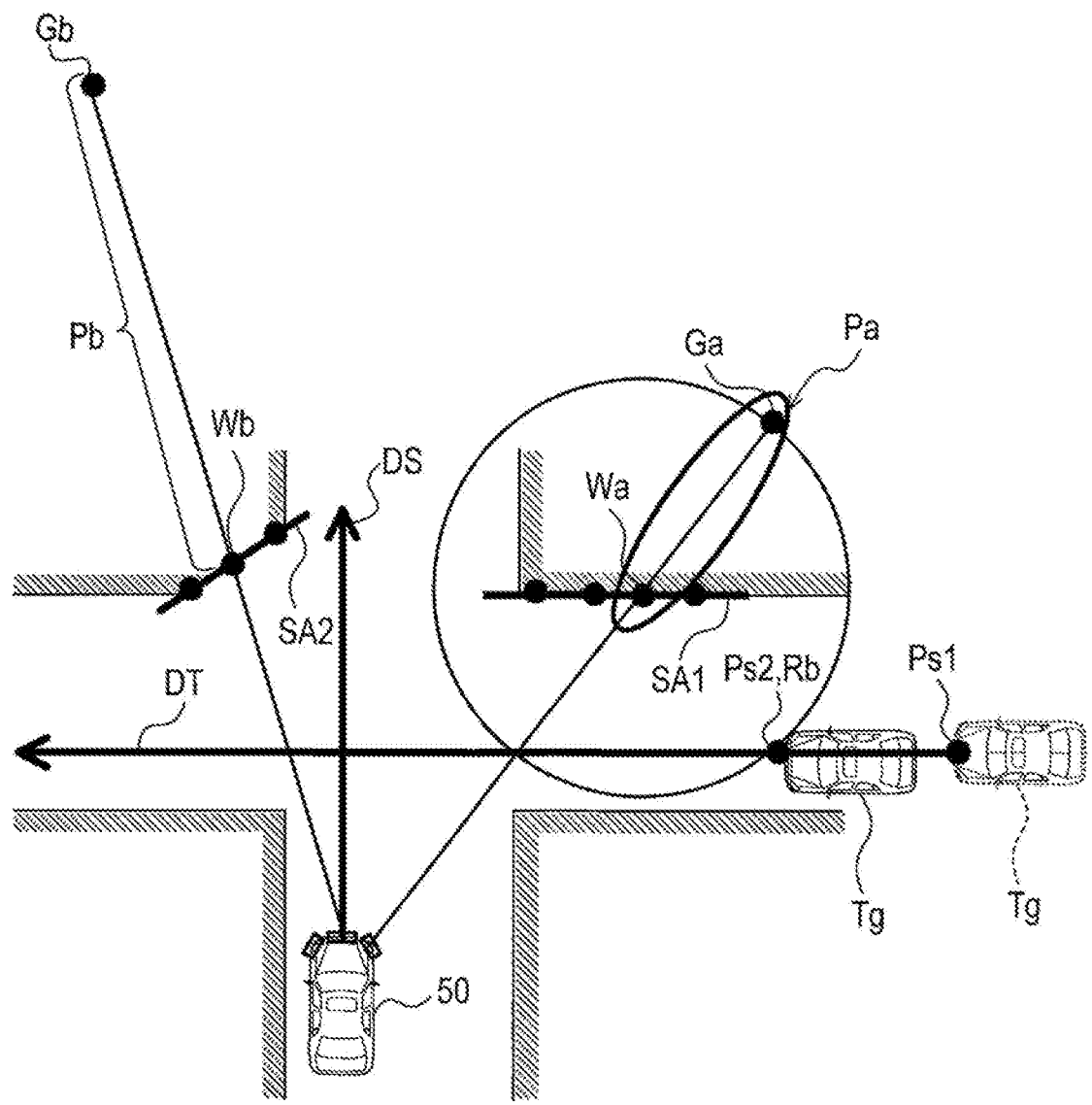
FIG. 6 is a diagram illustrating another example of a method for determining a position of a target from a pair of observation points, a direction in which a reflection surface faces, and a traveling direction of the target.

In addition, as shown in FIG. 6, when a plurality of mirror ghosts are generated by different reflection surfaces SA1, SA2, and a plurality of observation point pairs Pa, Pb are extracted, the target position determination section 34 calculates respective surface directions in which the plurality of reflection surfaces SA1, SA2 extend. That is, in the case of FIG. 6, the target position determination section 34 calculates a surface direction of the reflection surface SA1 from the reflection surface observation point Wa and observation points around the reflection surface observation point Wa, and calculates a surface direction of the reflection surface SA2 from the reflection surface observation point Wb and observation points around the reflection surface observation point Wb.

Next, in S80, the target position determination section 34 determines whether a target Tg has been detected two or more times with the inclusion of the current processing cycle. That is, the target position determination section 34 determines whether the same target Tg as that detected in the current processing cycle has been detected in a past processing cycle (e.g., a previous processing cycle). In S80, if it is determined that the target Tg has been detected two or more times, the present process proceeds to S90. If it is determined that the target Tg has been detected first time in the current processing cycle, the present process skips S90 and proceeds to S100.

In S90, the traveling direction calculation section 34a and the traveling direction position determination section 34b determine the position of the target Tg by using the surface direction of the reflection surface calculated in S70. Specifically, a high probability that there is a correlation between a reflection surface from which a mirror ghost is generated and a traveling direction of the target Tg is focused on. That is, it is focused on that it is highly likely that a reflection surface such as a wall or a guardrail that reflects reflected waves from the target Tg is located near the target Tg and the target Tg is traveling in the surface direction of the reflection surface.

Hence, as shown in FIG. 5, the traveling direction calculation section 34a calculates a traveling direction DT of the target Tg from a past position Ps1 that is a position of the target Tg determined in a past processing cycle and the surface direction, which is calculated in S70, in the current processing cycle or the past processing cycle in which the past position Ps1 is determined. As shown in FIG. 6, when a plurality of surface directions have been calculated in S70, the traveling direction calculation section 34a calculates respective traveling directions DT for the plurality of surface directions.

The traveling direction position determination section 34b calculates two intersections Ra, Rb of the calculated traveling direction DT and the virtual circle Ca passing through the mirror ghost observation point Ga of the observation point pair Pa centering on the reflection surface observation point Wa of the observation point pair Pa, and sets the two intersections Ra, Rb as candidates for a position of the target Tg. Then, the traveling direction position determination section 34b determines a position of one of the two intersections Ra, Rb closer to the past position Ps1 to be a current position Ps2 of the target Tg. When a plurality of traveling directions DT have been calculated by the traveling direction calculation section 34a, the traveling direction calculation section 34a determines a current position Ps2 of the target Tg by using a traveling direction DT included in the plurality of traveling directions DT and intersecting a traveling direction DS of the vehicle 50.

It is noted that the traveling direction DS of the vehicle 50 may intersect the plurality of traveling directions DT. Hence, when surface directions of the plurality of reflection surfaces have been calculated in S70, the traveling direction calculation section 34a may calculate the traveling direction DT by using the past position Ps1 and a surface direction obtained by averaging the surface directions of the plurality of reflection surfaces. Alternatively, in such a case, the traveling direction calculation section 34a may calculate a traveling direction DT by using the past position Ps1 and one of the surface directions of the plurality of reflection surfaces that has most observation points configuring the reflection surface. Alternatively, the traveling direction calculation section 34a may calculate a traveling direction DT by using the past position Ps1 and one of the surface directions of the plurality of reflection surfaces that is based on an observation point pair including a reflection surface observation point and a mirror ghost observation point having the shortest distance therebetween.

Figure 7:
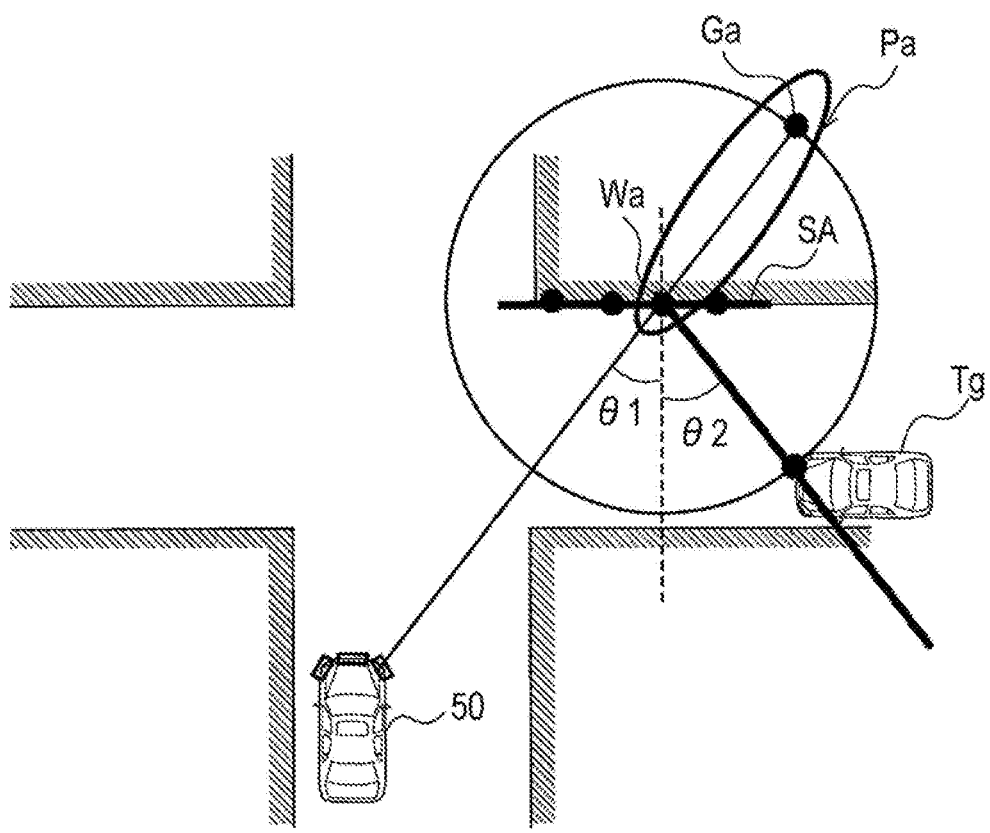
FIG. 7 is a block diagram illustrating an example of a method for determining a position of a target from a pair of observation points, a direction in which a reflection surface extends, and an incidence angle to the reflection surface.

Next, in S100, the direction calculation section 34c and the direction position determination section 34d determine the position of the target Tg by using the surface direction of the reflection surface calculated in FIG. 70. Specifically, as shown in FIG. 7, it is focused on that an incidence angle θ1 at which radar waves enter a reflection surface and a reflection angle θ2 at which the radar waves are reflected from the reflection surface agree with each other and the target Tg is located in the direction of the reflection angle θ2 with respect to the reflection surface.

Hence, the direction calculation section 34c calculates the direction of the reflection angle θ2 as a direction of the target Tg with respect to the reflection surface. The reflection angle θ2 is equal to the incidence angle θ1 of radar waves transmitted from the radar 10 to the reflection surface. Then, as shown in FIG. 7, the direction position determination section 34d determines a position, which is located on a virtual circle Ca passing through the mirror ghost observation point Ga of the observation point pair Pa centering on the reflection surface observation point Wa of observation point pair Pa and is located in the direction at the reflection angle θ2 from the reflection surface observation point Wa, to be the position of the target Tg. When a plurality of reflection surfaces have been calculated in S70, since the same position of the target Tg is determined by using any of the reflection surfaces, the position of the target Tg may be determined by using any of the reflection surfaces.

Next, in S110, the target position determination section 34 weighted-averages the target positions determined in S60, S90, and S100 and determines the average value to be a target position. When no target position has been determined in S60, the target position determination section 34 weighted-averages the target positions determined in S90 and S100 and determines the average value to be a target position. In the weighted average, weights of the respective plurality of target positions determined by different methods may be the same. Alternatively, in the weighted average, the weight of the target position determined in S60 may be maximized, the weight of the target position determined in S100 may be minimized, and the weight of the target position determined in S90 may be between the other weights.

Next, in S120, the target position determination section 34 determines whether the observation has been completed. For example, when the ignition is turned off, the observation is completed. If it is determined that the observation has not been completed in S110, the present process returns to S10. If it is determined that the observation has been completed in S110, the present process proceeds to S130.

In S130, the reliability calculation section 35 calculates reliability of the determined position of the observe the target Tg, and the present process ends. The reliability calculation section 35 calculates reliability of a first position and a second position. The first position is a position of the target Tg determined by using a direct signal, which is a received signal based on direct waves from the target Tg. The second position is a position of the target Tg determined in the process in S110. Specifically, when a second position agreeing with a first position is determined, the reliability calculation section 35 increases reliability of the first position so as to be higher than when a second position agreeing with a first position is not determined.

In addition, when a plurality of surface directions have been calculated in the process in S70, the reliability calculation section 35 increases reliability of the second position so as to be higher than when only one surface direction has been calculated. In addition, the reliability calculation section 35 sets reliability of the first position to be higher than reliability of the second position.

Furthermore, the reliability calculation section 35 may change reliability of the second position according to a speed of the vehicle 50. Specifically, the reliability calculation section 35 may increase reliability of the second position as the difference between a speed of the vehicle 50 and a threshold speed described above becomes smaller. When a speed of the vehicle 50 is higher than the threshold speed described above, the reliability calculation section 35 may decrease reliability of the second position. Accordingly, an incorrect target position can be prevented from being selected due to, for example, erroneous determination of the target Tg actually present to be a mirror ghost.

Then, when reliability of any of the first position and the second position has exceeded threshold reliability, the processing unit 30 fixes a target position. That is, the processing unit 30 fixes one of the first position and the second position whose reliability having exceeded the threshold reliability to be a target position.

It is noted that, as shown in FIG. 0.1, the processing unit 30 may perform the target position determination process based on the mirror ghost described above on condition that the speed of the vehicle 50 is lower than a predetermined threshold speed. That is, the processing unit 30 may determine the position of a target by using a mirror ghost observation point as long as the speed of the vehicle 50 is lower than the threshold speed. It can be considered that the location around which reflection surfaces generating a mirror ghost are present has poor visibility (e.g., an intersection), and the speed of the vehicle 50 is relatively low. Hence, the processing unit 30 may determine the position of a target by using a mirror ghost observation point only in a situation where a mirror ghost is easily generated. The threshold speed may be, for example, 30 km/h.

<3. Effects>

According to the embodiment described above, the following effects can be provided.

(1) From a reflection surface observation point and observation points therearound, a surface direction is calculated in which a reflection surface reflecting reflected waves from the target Tg extends. Finding the surface direction of the reflection surface can determine the position of the target from the surface direction of the reflection surface and a pair of observation points. That is, even when only one observation point pair is extracted, the position of the target can be determined.

(2) A direction of a reflection angle θ2 equal to an incidence angle θ1 at which radar waves enter a reflection surface can be calculated as a target direction. Hence, the position present in the calculated direction of the target Tg and distanced from a reflection observation point by a distance between the reflection observation point and the mirror ghost observation point can be determined to be the position of the target Tg.

(3) It is found that the reflection surface generating a mirror ghost is a wall, a guardrail or the like, and there is a high correlation between a surface direction of the reflection surface and a traveling direction of the target Tg. Hence, the traveling direction of the target Tg can be calculated from the past position Ps1 of the target Tg and the surface direction of the reflection surface. Then, the position nearer to the past position Ps1 between two positions on an extension of the traveling direction of the target Tg and distanced from a reflection surface observation point by a distance between the reflection observation point and the mirror ghost observation point can be determined as the position of the target Tg.

(4) When reflected waves from the target Tg are reflected from a plurality of reflection surfaces, a plurality of surface directions of the reflection surfaces may be calculated. In such a case, traveling directions of the target Tg are calculated from the respective surface directions. The target Tg to which the most attention is to be paid by the vehicle 50 is a target traveling in a direction intersecting the traveling direction of the vehicle 50. Hence, the position of the target Tg is determined by using a traveling direction included in the calculated traveling directions and intersecting the traveling direction of the vehicle 50. Hence, when a plurality of surface directions have been calculated, it can be determined that the target Tg is traveling in the direction to which the most attention is to be paid to enhance safety.

(5) If the position of the target Tg is determined by using a mirror ghost observation point only when the speed of the vehicle 50 is lower than a threshold value, the position of the target Tg is determined by using the mirror ghost observation point only in a situation in which a mirror ghost appears. Hence, an incorrect target position can be prevented from being selected due to, for example, erroneous determination of the actually present target Tg to be a mirror ghost.

(6) When a second position of the target Tg agreeing with a first position of the target Tg is determined, reliability of the first position becomes higher than when the second position of the target Tg agreeing with the first position of the target Tg is not determined. Hence, when the first position and the second position agree with each other, the position of the target Tg can be fixed early. Furthermore, alarm information can be provided to the driver early.

(7) When a plurality of surface directions of reflection surfaces have been calculated, reliability of the second position of the target Tg is set to be higher than when only one surface direction has been calculated. Hence, when reflected waves from the target Tg are reflected from the plurality of surface directions to generate a plurality of mirror ghosts, the position of the target Tg can be fixed early. Furthermore, alarm information can be provided to the driver early.

(8) Reliability of the first position of the target Tg is set to be higher than reliability of the second position. Hence, the first position has higher priority than the second position, whereby an incorrect position of the target Tg can be prevented from being selected.

OTHER EMBODIMENTS

An embodiment of the present disclosure has been described above. However, the present disclosure is not limited to the above embodiment but can be implemented with various modifications.

(a) In the above embodiment, the processing unit 30 performs the processes in S60, S90, and S100 in this order to determine the position of a target by using a plurality of different methods. However, the present disclosure is not limited to this. For example, the processing unit 30 may, after performing the process in S60, proceed to the process in S120 without performing the processes in S90 and S100, or may, after performing the process in S90, proceed to the process in S120 without performing the process in S100. That is, the processing unit 30 may only determine the position by using a single method. In this case, priorities may be assigned to the three method in decreasing order of weight of the weighted average described above.

(b) In the above embodiment, the processing unit 30 may not perform the processes in S50 and S60 in the target position determination process.

(c) In the above embodiment, three radars 11 to 13 are mounted on the front side of the vehicle 50. However, only one radar 11 may be mounted, or two radars 12 and 13 may be mounted. The radars may be mounted on the rear side of the vehicle 50. That is, at least one radar may be mounted to the vehicle 50, and the position where the radar is mounted is not limited.

(d) The processing unit 30 and means thereof described in the present disclosure may be implemented by a dedicated computer configured by a processor, which is programed to perform one or more functions embodied by a computer program, and a memory. Alternatively, the processing unit 30 and means thereof described in the present disclosure may be implemented by a dedicated computer configured by a processor configured by one or more dedicated hardware logic circuit. The processing unit 30 and means thereof described in the present disclosure may be implemented by one or more dedicated computer configured by the combination of a processor that is programed to perform one or more functions and a processor configured by a memory and one or more hardware logic circuit. In addition, the computer program may be stored, as instructions executed by a computer, in a computer readable non-transitory tangible storage medium. Means for performing the functions of parts included in the processing unit 30 does not necessarily include software, but all the functions may be implemented by using one or more hardware units.

(e) In the above embodiment, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, a part of the configuration of the above embodiment may be omitted. Furthermore, at least a part of the configuration of the above embodiment may be added to or substituted by another part of the configuration of the above embodiment.

(f) The present disclosure may be implemented by, in addition to the vehicle radar system described above, various forms such as a program for causing a computer to function as a control unit of the vehicle radar system, a non-transitory tangible storage medium storing the program, for example, semiconductor memory, and a position detection method.

An aspect of the present disclosure is a vehicle radar system (100) that is installed in a vehicle (50). The vehicle radar system includes at least one radar (11 to 13), a detection section (31), an extraction section (32), a pair determination section (33), and a target position determination section (34). The radar is configured to observe areas around the vehicle and different from each other. The extraction section is configured to extract at least one observation point pair from the plurality of observation points detected by the detection section. The at least one observation point pair is a pair of the observation points located in the same direction with reference to the radar. The pair determination section is configured to determine each observation point of the at least one observation point pair extracted by the extraction section further from the radar to be a mirror ghost observation point indicating a mirror ghost of a target, and determines each observation point of the at least one observation point pair nearer to the radar to be a reflection surface observation point indicating a reflection surface reflecting reflected waves from the target. The target position determination section is configured to calculate a surface direction of the reflection surface on a bird's eye view of the vehicle from above the vehicle, from the reflection surface observation point of the at least one observation point pair and observation points around the reflection surface observation point, and determine a position of the target from the calculated surface direction and the at least one observation point pair.

According to the aspect of the present disclosure, a surface direction of a reflection surface reflecting reflected waves from a target is calculated from a reflection surface observation point and observation points around the reflection surface observation point. When the surface direction of the reflection surface is found, the position of the target can be determined from the surface direction of the reflection surface and a pair of observation points. That is, even when there is only one observation point pair, the position of the target can be determined.

What is claimed is:

1. A vehicle radar system that is installed in a vehicle, the system comprising:
    at least one radar configured to observe areas around the vehicle and different from each other;
    a detection section configured to detect a plurality of observation points from observation data obtained by the radar;
    an extraction section configured to extract at least one observation point pair from the plurality of observation points detected by the detection section, the at least one observation point pair being a pair of the observation points located in the same direction with reference to the radar;
    a pair determination section configured to determine each observation point of the at least one observation point pair extracted by the extraction section further from the radar to be a mirror ghost observation point indicating a mirror ghost of a target, and determines each observation point of the at least one observation point pair nearer to the radar to be a reflection surface observation point indicating a reflection surface reflecting reflected waves from the target; and
    a target position determination section configured to calculate a surface direction of the reflection surface on a bird's eye view of the vehicle from above the vehicle, from the reflection surface observation point of the at least one observation point pair and observation points around the reflection surface observation point, and determine a position of the target from the calculated surface direction and the at least one observation point pair.

2. The vehicle radar system according to claim 1, wherein the target position determination section includes:
    a direction calculation section configured to calculate a direction of a reflection angle as a direction of the target with respect to the surface direction, the reflection angle being equal to an incidence angle of radar waves transmitted from the radar to the reflection surface; and
    a direction position determination section configured to determine, to be a position of the target, a position present in the direction of the target detected by the direction calculation section and distanced from the reflection surface observation point of the observation point pair by a distance between the reflection observation point and the mirror ghost observation point of the observation point pair.

3. The vehicle radar system according to claim 1, wherein the target position determination section includes:
    a traveling direction calculation section configure to calculate a traveling direction of the target from a past position that is a position of the target determined at a first point in time and the surface direction, which is calculated at a first point in time or a second point in time after the first point in time; and
    a traveling direction position determination section configured to determine, to be a position of the target at the second point in time, a position that is nearer to the past position between positions on an extension of the traveling direction calculated by the traveling direction calculation section and distanced from the reflection surface observation point of the observation point pair by a distance between the reflection surface observation point and the mirror ghost observation point of the observation point pair.

4. The vehicle radar system according to claim 3, wherein the traveling direction calculation section is configured to, when surface directions of a plurality of reflection surfaces have been calculated, calculate the traveling direction for each of the surface directions by using each of the surface directions, and
    the target position determination section determines a position of the target by using a traveling direction intersecting a traveling direction of the vehicle included in the traveling direction calculated by the traveling direction calculation section.

5. The vehicle radar system according to claim 3, wherein the traveling direction calculation section is configured to, when surface directions of a plurality of reflection surfaces have been calculated, calculate the traveling direction by using a surface direction obtained by averaging the surface directions of the plurality of reflection surfaces.

6. The vehicle radar system according to claim 3, wherein the traveling direction calculation section is configured to, when surface directions of a plurality of reflection surfaces have been calculated, calculate the traveling direction by using one of the surface directions of the plurality of reflection surfaces that has most observation points configuring the reflection surface.

7. The vehicle radar system according to claim 3, wherein the traveling direction calculation section is configured to, when surface directions of a plurality of reflection surfaces have been calculated, calculate the traveling direction by using one of the surface directions of the plurality of reflection surfaces that is based on the observation point pair including the reflection surface observation point and the mirror ghost observation point having the shortest distance therebetween.

8. The vehicle radar system according to claim 1, wherein the target position determination section is configured to determine a position of the target by using the mirror ghost observation point on condition that a speed of the vehicle is lower than a predetermined threshold speed.

9. The vehicle radar system according to claim 1, further comprising a reliability calculation section configured to calculate reliability of the determined position of the target, wherein
    the reliability calculation section is configured to change the reliability of the position of the target determined by the target position determination section according to a speed of the vehicle.

10. The vehicle radar system according to claim 9, wherein
the reliability calculation section is configured to increase the reliability of the position of the target determined by the target position determination section, as a difference between the speed of the vehicle and a predetermined threshold speed becomes smaller.

11. The vehicle radar system according to claim 9, wherein
the reliability calculation section is configured to decrease the reliability of the position of the target determined by the target position determination section, as the speed of the vehicle is higher than a predetermined threshold speed.

12. The vehicle radar system according to claim 1, further comprising a reliability calculation section configured to calculate reliability of the determined position of the target, wherein
the reliability calculation section is configured to, when the target position determination section has determined a position of the target agreeing with a position of the target determined based on a direct signal, increase the reliability of the position of the target determined based on the direct signal, the direct signal being a received signal including reflected waves directly received from the target.

13. The vehicle radar system according to claim 1, further comprising a reliability calculation section configured to calculate reliability of the determined position of the target, wherein
the reliability calculation section is configured to, when the target position determination section has calculated a plurality of surface directions, increase the reliability of the position of the target determined by the target position determination section.

14. The vehicle radar system according to claim 1, further comprising a reliability calculation section configured to calculate reliability of the determined position of the target, wherein
the reliability calculation section is configured to set reliability of the position of the target determined based on a direct signal to be higher than reliability of the position of the target determined by the target position determination section, the direct signal being a received signal including reflected waves directly received from the target.

\* \* \* \* \*